UNITED STATES PATENT OFFICE.

WILHELM BORCHERS AND EDUARD THILGES, OF AACHEN, GERMANY.

PROCESS FOR SEPARATING IRON AND NICKEL FROM COPPER IN CERTAIN ORES AND MASSES.

1,152,699.  Specification of Letters Patent.  Patented Sept. 7, 1915.

No Drawing.  Application filed May 25, 1914.  Serial No. 840,886.

*To all whom it may concern:*

Be it known that we, Dr. WILHELM BORCHERS, professor, a subject of the German Emperor, and resident of 15 Ludwigsallee, Aachen, Germany, and EDUARD THILGES, engineer, a subject of the Grand Duchess of Luxemburg, and resident of 28 Lochnerstrasse, Aachen, Germany, have invented certain new and useful Improvements in Processes for Separating Iron and Nickel from Copper in Certain Ores and Masses; and we do hereby declare the following to be a full, clear, and exact description of the invention, such as will enable others skilled in the art to which it appertains to make and use the same.

This invention relates to a process for separating nickel and copper from ores, metallurgical products and waste containing these two metals.

In the case of ores, these are smelted to a matte by any usual known process. Even from ores containing comparatively little nickel and copper, it is easy, if necessary with a preliminary roasting, to produce a matte containing about 10 to 12 per cent. of Ni+Cu.

It is well known that besides the sulfids of nickel and copper, such a matte contains a preponderance of iron sulfid.

Experiments made by Lehmer in the year 1906 at the Institute for Metallurgy and Electrometallurgy of the Royal Technical University of Aachen, ("*Metallurgie*" 1906, vol. 3, page 549), showed that very pure metals could be produced directly by electrically smelting the sulfids of most ore metals with carbon and limestone or lime. According to this, it would be an easy matter to produce copper-nickel alloys by enriching the matte to a sufficient degree. The market for copper-nickel alloys is however very much more restricted than that for ferro-nickel. Now since large quantities of iron sulfids are present in copper-containing nickel pyrites and also in the matte that has been produced by smelting from such pyrites and also from other nickel ores, it would be very important to be able to work up such ores or such matte for the production of ferro-nickel. A high percentage of contained copper is however a drawback in ferro-nickel.

It has now been discovered that copper can be separated for the greater part from nickel and iron by melting copper-nickel matte with larger quantities of lime but with smaller quantities of carbon than the quantities required according to the reaction equations stated by Lehmer.

According to Lehmer the reactions are as follows:

$$NiS + CaO + C = Ni + CaS + CO.$$
$$Cu_2S + CaO + C = Cu_2 + CaS + CO.$$
$$FeS + CaO + C = Fe + CaS + CO.$$

Now for the purpose of preventing the copper from separating out as well, the following procedure is employed:—First the matte is melted down on the hearth (lined with carbon plugging or lining) of a suitable furnace, preferably an electric furnace. If rich ores are available, directly these are melted down in the said furnace. The sulfids react very little with the carbon lining. Then an excess of lime (limestone may be used if desired) is added and also melted down. On the above reaction taking place, first the iron sulfids and nickel sulfids that are present in a largely preponderant quantity are reduced. This is accompanied by continually increasing quantities of calcium sulfid. These last quantities however combine chiefly with the copper sulfid to form solutions or compounds which are a considerable hindrance to the decomposition of the copper sulfid as set forth in the above equations. Owing however to the circumstance that the carbon required for these reactions must first be taken from the hearth lining, that is to say, the said carbon is not distributed in the "melt," while iron and nickel which are the first metals to become separated out, are present on the hearth, this reagent can have only a very small action upon the mixture of copper sulfid, lime and calcium sulfid. The carbon acts partly only in an indirect manner, by being first dissolved by the iron or ferro-nickel, whereupon only then it comes into reaction with the "melt" floating above it. It is to be understood that it is not necessary to keep strictly to this example as regards the supplying of the carbonaceous reducing agent. The example is intended simply to serve as an illustration of the fundamental idea of this invention, namely, of causing the reducing agent to act gradually, in order that a first iron shall be separated out to a preponderant extent, and then nickel shall be separated out as well as iron, so as to increase the amount of sulfids in a basic slag, which sulfids retard the simultaneous production of copper as much as possible. By fulfilling these conditions, it is an easy matter by smelting comparatively poor copper-nickel mattes, to produce ferro-nickel which is poor in copper, and contains 15 to 20 per cent. of nickel.

Since the "melt" which contains calcium sulfid and which is formed as a highly basic matte, takes up a portion of the nickel in addition to the main quantity of copper, the said "melt" might be utilized as an addition to ores which are to be smelted to matte.

Having now particularly described and ascertained the nature of our said invention and in what manner the same is to be performed, we declare that what we claim is:

1. The method of recovering iron and nickel from sulfid ores, matte and like material containing copper, which comprises smelting the material with an excess of calcareous flux in a carbon-lined furnace, for the purpose described.

2. The method of recovering iron and nickel from sulfid ores, matte and like material containing copper, which comprises smelting the material with an excess of calcareous flux and sufficient carbonaceous material to reduce only the iron and nickel and separating the ferro-nickel constituents.

3. The method of recovering iron and nickel from sulfid ores, matte and like material containing copper, which comprises smelting the material with an excess of calcareous flux and sufficient carbonaceous material to reduce only the iron and nickel and allowing the carbonaceous reducing agent to act gradually upon the material being treated, for the purpose described.

4. The method of recovering iron and nickel from sulfid ores, matte and like material containing copper, which comprises smelting the material with an excess of calcareous flux and sufficient carbonaceous material to first reduce only the iron and nickel and to cause the resulting quantity of calcium sulfid to retard the separation of copper, whereby ferro-nickel may be obtained substantially free from copper.

In testimony whereof we affixed our signatures, in presence of two witnesses.

DR. WILHELM BORCHERS.
EDUARD THILGES.

Witnesses:
HENRY QUADFLIEG,
PAUL DECES.